H. S. BUSBY.
APPARATUS FOR COMPARING, MATCHING, AND MEASURING SHADES AND COLORS.
APPLICATION FILED JUNE 8, 1920.
Patented July 12, 1921.
9 SHEETS—SHEET 1.
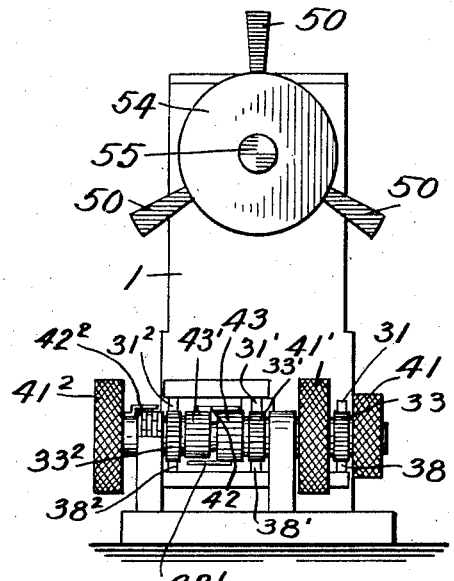
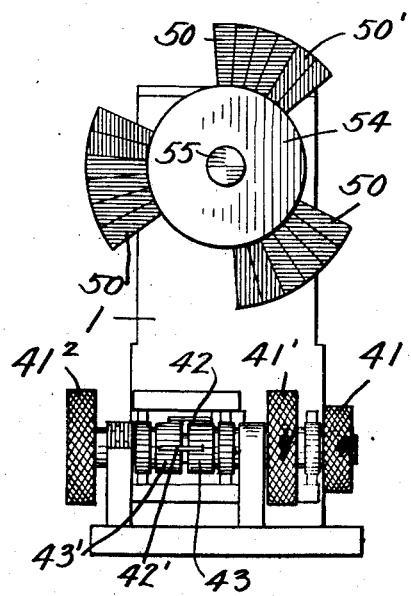
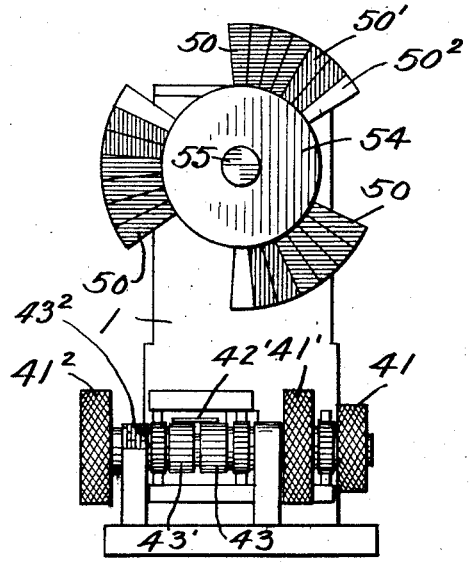
Inventor
H. S. BUSBY
By his Attorneys

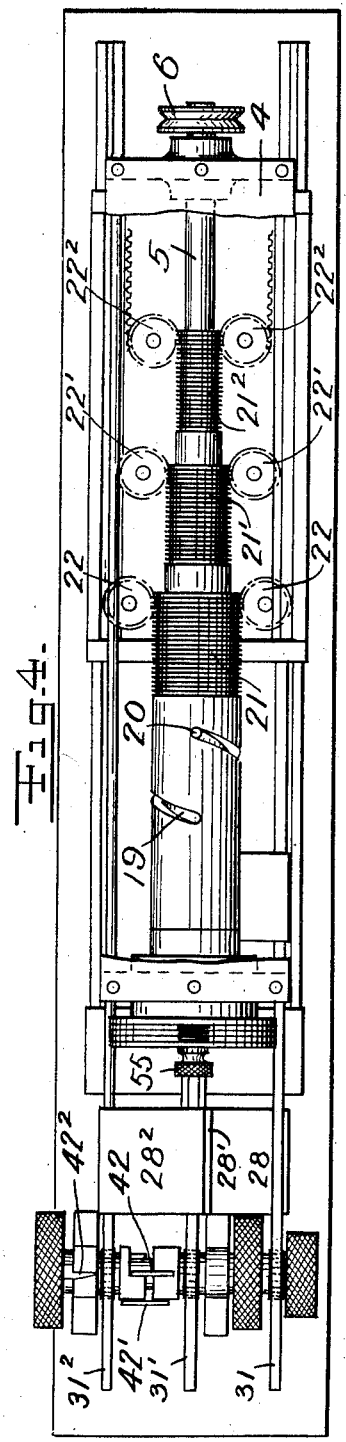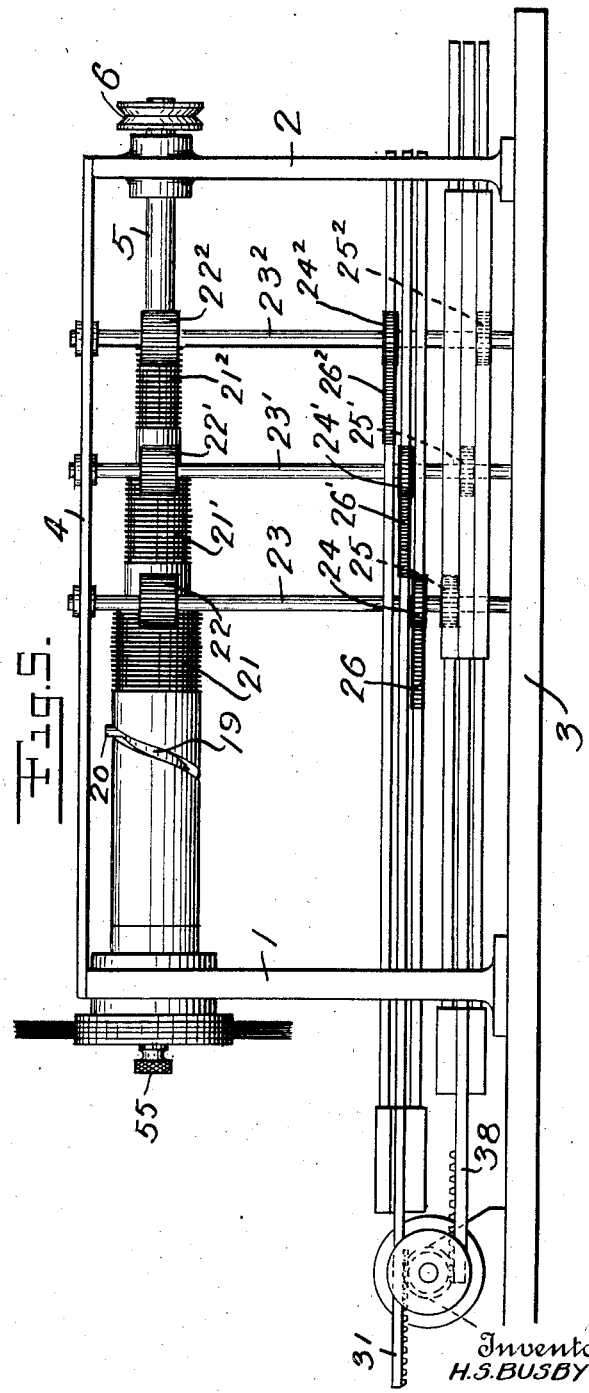

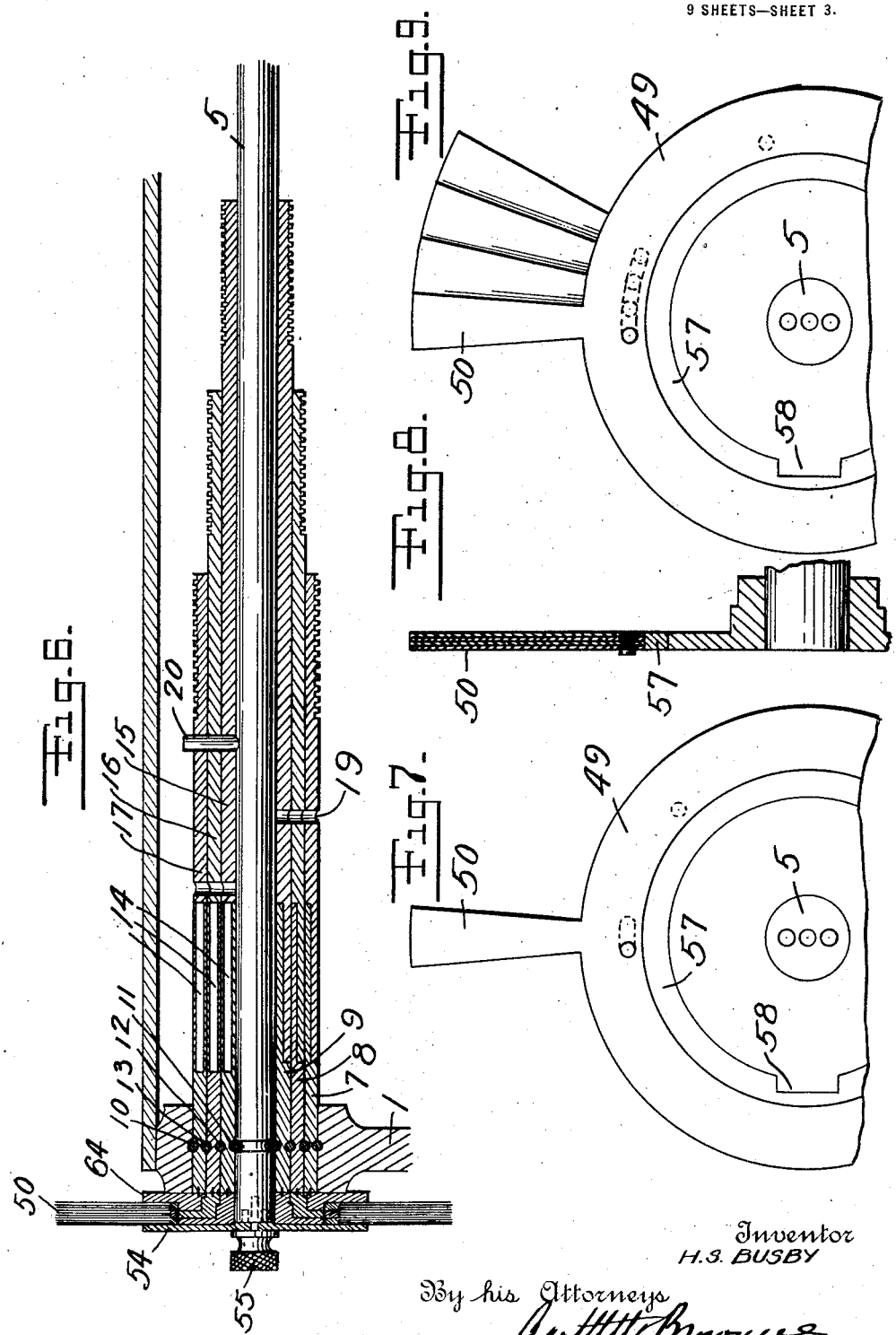

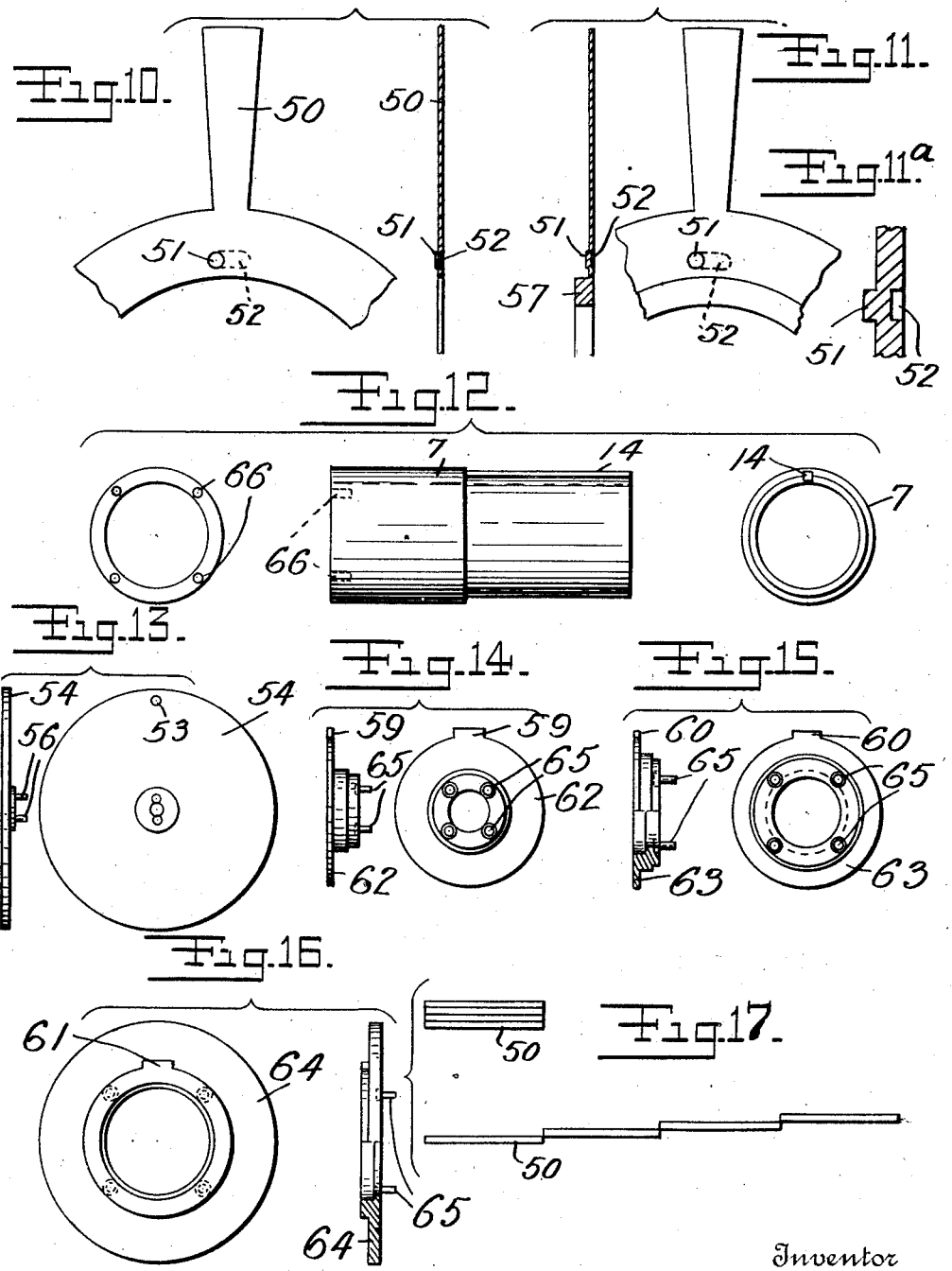

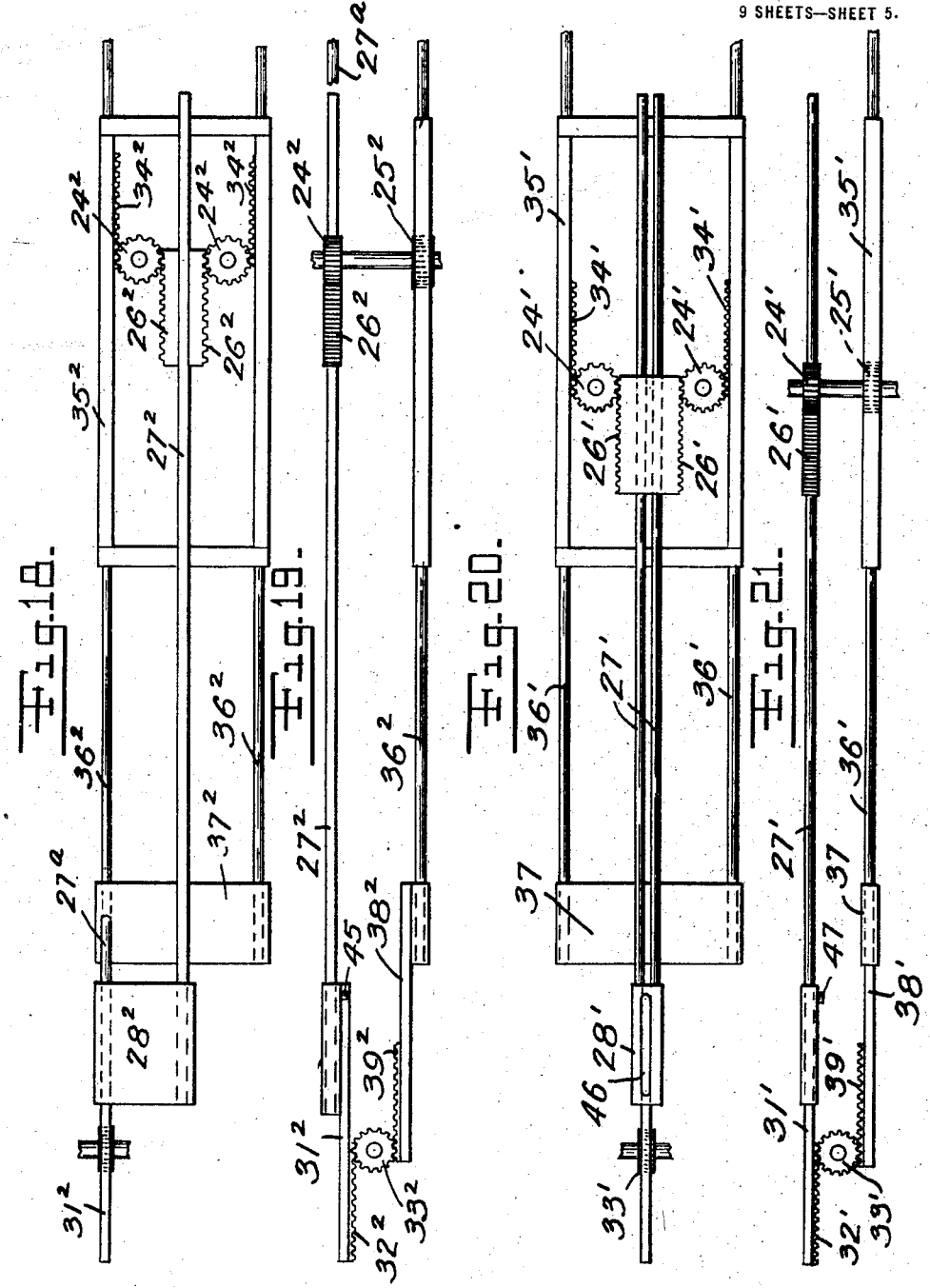

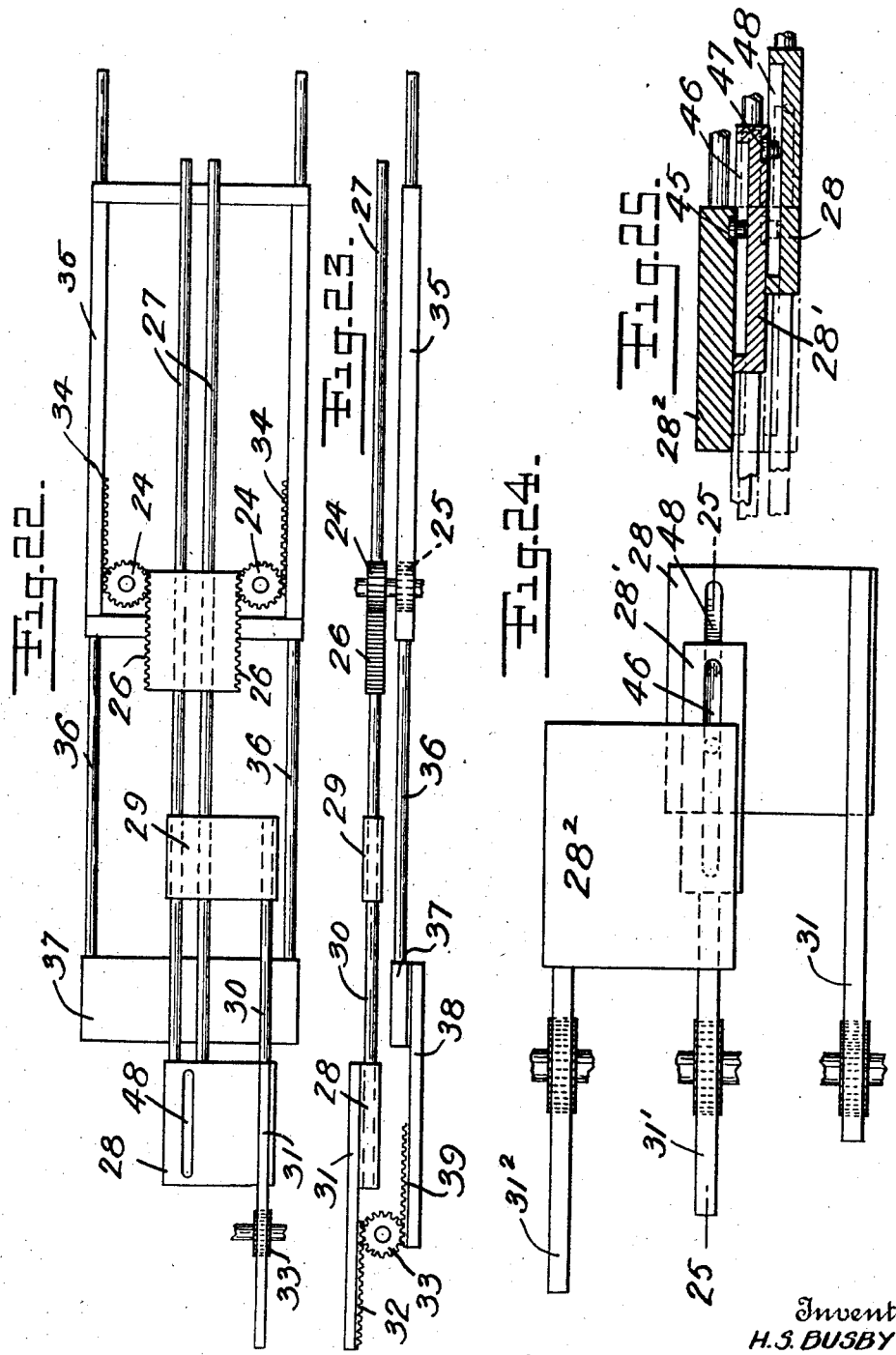

H. S. BUSBY.
APPARATUS FOR COMPARING, MATCHING, AND MEASURING SHADES AND COLORS.
APPLICATION FILED JUNE 8, 1920.

1,384,513.

Patented July 12, 1921.

Inventor
H. S. BUSBY
By his Attorneys

H. S. BUSBY.
APPARATUS FOR COMPARING, MATCHING, AND MEASURING SHADES AND COLORS.
APPLICATION FILED JUNE 8, 1920.

1,384,513.

Patented July 12, 1921.
9 SHEETS—SHEET 9.

Inventor
H. S. Busby
By his Attorneys
Bartlett Brownell

UNITED STATES PATENT OFFICE.

HIBBARD S. BUSBY, OF SOUTH MANCHESTER, CONNECTICUT, ASSIGNOR TO CHENEY BROTHERS, OF SOUTH MANCHESTER, CONNECTICUT, A CORPORATION OF CONNECTICUT.

APPARATUS FOR COMPARING, MATCHING, AND MEASURING SHADES AND COLORS.

1,384,513.      Specification of Letters Patent.      Patented July 12, 1921.

Application filed June 8, 1920. Serial No. 387,485.

*To all whom it may concern:*

Be it known that I, HIBBARD S. BUSBY, a citizen of the United States, residing at South Manchester, county of Hartford, and State of Connecticut, have invented a certain new and useful Improvement in Apparatus for Comparing, Matching, and Measuring Shades and Colors, of which the following is a full, clear, and exact description.

My invention relates to apparatus for comparing, matching and measuring shades and colors and has for its object to provide an apparatus for use in the rapid matching of gradations in color. It further has for its object to provide an apparatus for use in producing any number of colors and shades, and to provide means so that from suitable records any one of those colors and shades can be reproduced, and, contrariwise, so that any number of shades can be analyzed and the necessary conditions for reproducing them recorded with a high degree of speed and accuracy and without the necessity of stopping the apparatus in order to make changes during the process of matching. It further has for its object to provide an apparatus in which the amount of a color display can be varied from a small amount to a much greater amount by adjustment of the control and without other change of apparatus. It further has for its object to provide an apparatus in which the adjusting means are readily accessible and can be actuated without removing the eye from the observing point. It further has for its object to provide an apparatus in which any color can be matched by the use of suitable standards.

One feature of my invention consists in means for adjusting sectors independently while the apparatus is in operation. Another feature consists in the use of groups of elements, each group constituting a sector. Another feature consists of means whereby the group of elements belonging to a succeeding color is mechanically connected to the groups of elements belonging to a preceding color so as to be advanced thereby. Another feature of my invention consists in the manual adjusting means located at the front of the instrument so as to be easily operable while making observations. Another feature consists of novel means whereby a plurality of sectors can be relatively adjusted without axial movement of the sectors. Another feature of my invention consists in the use of composite scales for indicating the extent of opening of groups of elements of different sizes. Another feature of my invention consists of means for observing color effect produced by the sectors and comparing it with any other color medium.

Broadly speaking, my complete apparatus, as shown, comprises what is known as an episcotister which is an apparatus for rotating several adjustable sectors arranged in suitable relation to one another and carrying different colors. My principal improvement consists in providing improved means for adjusting the sectors while they are being rotated. In connection therewith I have incidentally invented a means for observing the effects produced by the rotation of the adjusted sectors.

The following is a description of an embodiment of my invention, reference being had to the accompanying drawings, in which, Figure 1 is a front elevation of the episcotister with the sectors closed to the smallest extent possible with the size of sector shown;

Fig. 2 is a similar view showing the primary sector open to its fullest extent and the secondary sector partially open;

Fig. 3 is a view similar to Fig. 2 with the tertiary sector partially open;

Fig. 4 is a plan view of the episcotister with the top plate broken away;

Fig. 5 is a side elevation of the same;

Fig. 6 is a vertical section through the axis of the rotating elements;

Fig. 7 is a front elevation of the front sector pack in closed position;

Fig. 8 is a vertical section through the same;

Fig. 9 is a front elevation of this pack opened up to its fullest extent;

Fig. 10 is a detail of certain elements of the pack;

Fig. 11 shows details of the rear element of the pack;

Figure 26:
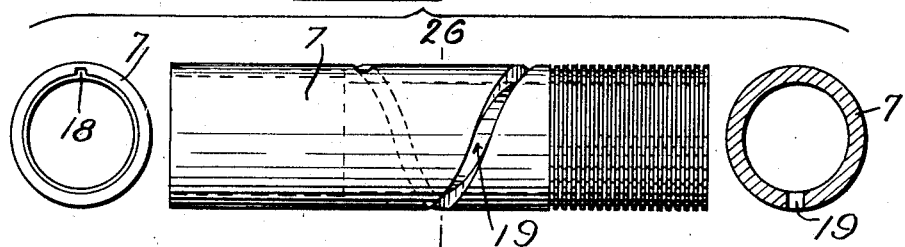
Figure 27:
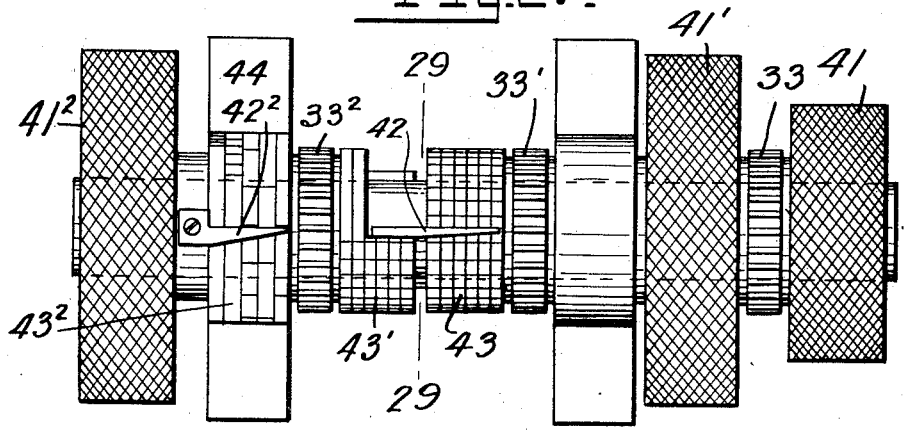
Figure 28:
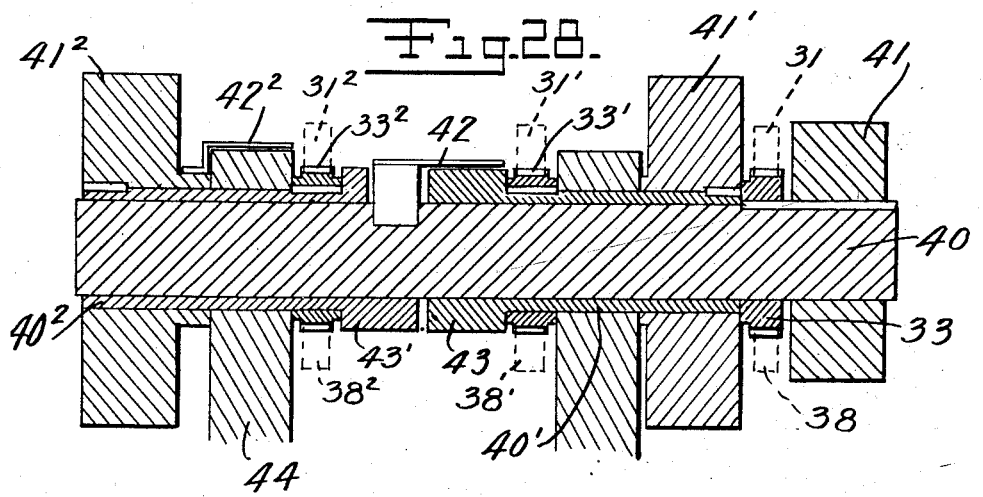
Figure 29:
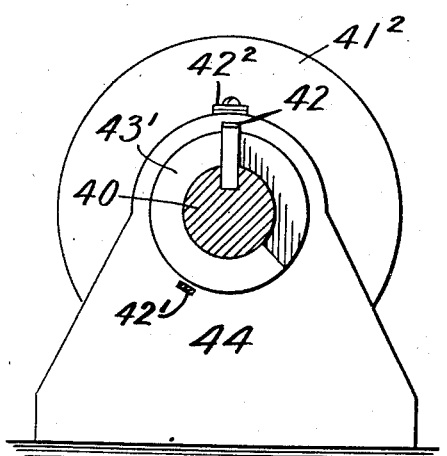
Figure 30:
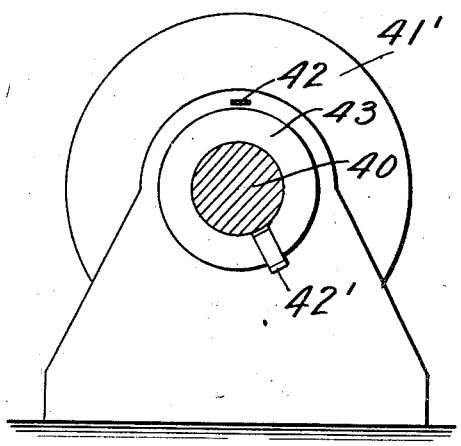
Figure 31:
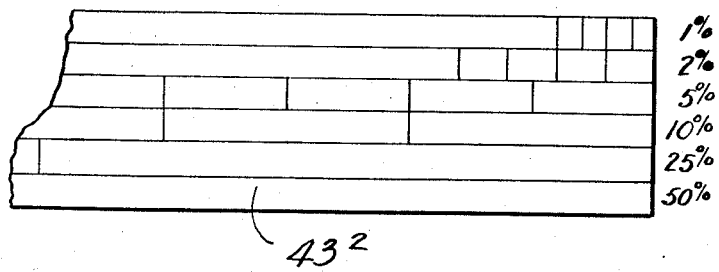
Figure 34:
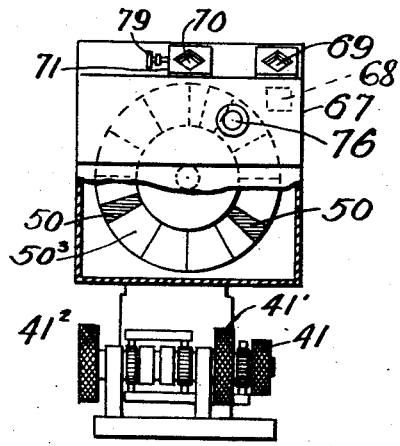
Figure 32:
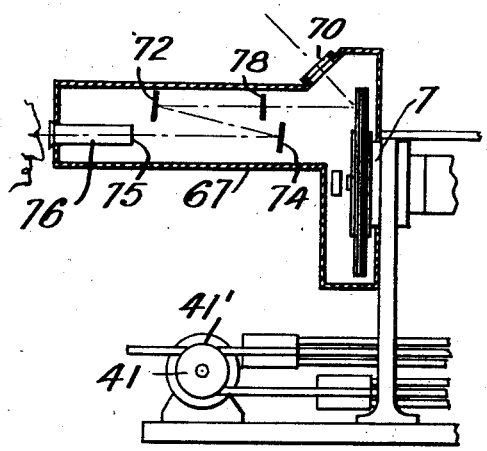
Figure 33:
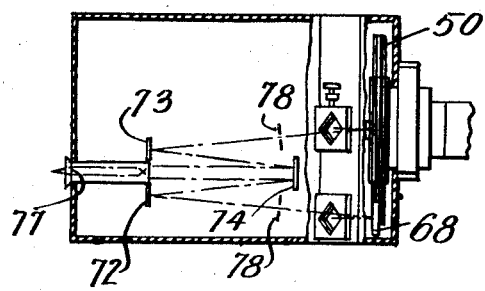
Figure 35:
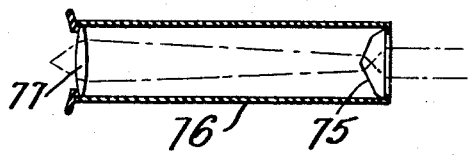

Fig. 11$^a$ is an enlarged detail of the elements of Figs. 10 and 11;

Fig. 12 is a front-end, side and rear-end view of a sleeve connected to the rear sector pack;

Fig. 13 is a front plate for mechanically connecting the front element of the front pack with the driving shaft;

Fig. 14 is a detail illustration of a member intermediate between the first sector pack and its sleeve;

Fig. 15 is a detail of a similar intermediate member connecting the second sector group with its sleeve;

Fig. 16 is a view of a similar intermediate member connecting the third sector pack with its sleeve;

Fig. 17 shows in plan view a sector pack closed and open as in Figs. 7 and 9;

Fig. 18 shows a detailed plan view of thrust and pull arms for adjusting the front pack of sectors;

Fig. 19 is a side elevation of the same;

Fig. 20 is a detailed plan view of thrust and pull arms for adjusting the secondary pack of sectors;

Fig. 21 is a side elevation of the same;

Fig. 22 is a detailed plan view of the thrust and pull arms for adjusting the tertiary pack of sectors;

Fig. 23 is a side elevation of the same;

Fig. 24 is a detailed view showing means whereby the thrust arms for adjusting the several groups are interconnected so that a movement of the primary thrust arm in the sector opening direction is transmitted to the secondary thrust arm and the movement of the secondary thrust arm is, in turn, transmitted to the tertiary thrust arm;

Fig. 25 is a section on the line 25—25, Fig. 24;

Fig. 26 shows a sliding sleeve coöperating with the sleeve of Fig. 12, the same being shown in end elevation, side elevation, and section on the line 26—26;

Fig. 27 is an enlarged plan view of the pull and push arm operating means and indicators carried thereby;

Fig. 28 is a vertical longitudinal section through the same;

Fig. 29 is a section on the line 29—29, Fig. 27, looking toward the left;

Fig. 30 is a similar section looking toward the right;

Fig. 31 is a developed scale showing the arrangement of markings;

Fig. 32 is a side elevation on an enlarged scale of a portion of the apparatus embodying the episcotister shown in the preceding drawings and means partially in section for observing and comparing the color effects produced thereby;

Fig. 33 is a plan view of the same;

Fig. 34 is a front elevation of the same, partly broken away; and,

Fig. 35 shows diagrammatically a divided field telescope and the paths of the rays of light through it.

Referring more particularly to the drawings, 1, 2 are the front and rear members of a framework mounted upon a base 3 and carrying on their upper ends a top plate 4, (Figs. 4 and 5). 5 is a driving shaft having a driving pulley 6 and journaled in the rear frame 2, the same being adapted to be driven by a belt from a small electric motor (not shown). The front end of this shaft is surrounded by three sleeves 7, 8 and 9 (Fig. 6), the outer one of which is held against longitudinal movement relatively to the member 1 by babbitted grooves 10, while each of the others is held from longitudinal movement relatively to the members on each side by babbitted grooves 11, 12 and 13. These babbitted grooves, while holding the sleeves against longitudinal movement, permit them all to rotate relatively to the member 1 and to the shaft 5 and to each other. These sleeves are provided with seats in which are shrunk spline keys 14. Co-acting with these sleeves and movable longitudinally relatively thereto and to the shaft 5 are additional sleeves 15, 16 and 17, having key-ways adapted to slide over the spline keys 14 respectively, the key-ways for the outer additional sleeve being shown at 18 in Fig. 26, and the other key-ways being similar thereto. Each of these additional sleeves is provided with a cam slot, all of which cam slots are in alinement radially, as shown at 19 (Fig. 6) when the additional sleeves are in their extreme forward position. An outline of the cam slot in the outer additional sleeve is shown in Figs. 4, 5, and 26. The shaft 5 carries a pin 20 which protrudes through these slots and the angle which these cam slots make with the central line of the machine is such that when a sleeve is moved longitudinally the engagement between its slot and the pin causes the sleeve to turn about its axis relative to the central shaft 5. In order to secure satisfactory results, I preferably make this angle 45° or less. These additional sleeves may be moved longitudinally by various means. For accomplishing that result in the present embodiment, I provide the rear ends of these additional sleeves with circular racks 21, 21', 21² respectively and provide pinions 22, 22', 22² mounted on vertical shafts 23, 23', 23², mounted in the base 3 and top plate 4. These shafts near their lower ends are provided respectively with pinions 24, 25, 24', 25', 24², 25², as shown in Fig. 5. I preferably provide a pair of shafts and pinions for each of the tubular racks 21, 21' and 21², the pinions engaging said racks at points diametrically opposite to one another and being carried by corresponding shafts. The shafts 23, 23' and 23² are independently controlled by racks and means for reciprocating the racks. Thus, the upper pinions 24, 24' and 24² are engaged respectively by racks 26, 26' and 26², which engage the inner sides of their pinions, as shown more clearly in Figs. 18 to 23 inclusive. These racks 26, 26' and 26² are carried by rods 27, 27' and 27², shown in Figs. 18, 20 and 22, which slide in suitable openings in the members 1 and 2. The rods 27 at their forward ends are connected together by plates 28, 29 which extend to one side thereof and are connected together by a rod 30. To the upper surface of the plate 28 a square rod 31 is connected, having on the under surface of its forward end a rack 32, which is engaged by a pinion 33 for purposes hereinafter described.

The rods 27' (Fig. 20) are connected by a plate 28' from the end of which extends a rod 31' carrying a rack 32' engaging a gear 33'.

The rod 27² is connected to a plate 28², to the lower side of which is secured a rack bar 31² carrying a rack 32² engaging a pinion 33² (Figs. 18 and 19). From the plate 28² extends a rod 27ª, which has a sliding bearing in the frame members 1 and 2 so as to steady the rod 27² and the parts connected thereto. The duplication of the rods 27 and 27', both of which have sliding engagement with the members 1 and 2, produces the same steadying effect of their respective racks.

The racks 26, 26', 26² I term thrust-racks, since they act by a thrust action when starting from their initial position.

In addition to these thrust racks, I provide pull racks, shown at 34, 34', and 34², which engage the outer sides of the corresponding pinions 25, 25', 25². The pull racks 34 are carried by a frame 35 supported on sliding rods 36, mounted in the frame members 1 and 2. These rods 36 are connected together by the frames 35 and also at their forward ends by a plate 37. This plate 37 has secured to its under side a rack bar 38, which is provided with a rack 39, which engages the under side of the pinion 33. In a similar way, for actuating the shafts 24' by a pull action, I provide a frame 35' carrying racks 34' and mounted on rods 36', which make sliding engagement with the frame members 1 and 2. The rods 35 are also connected together at their forward ends by a plate 37' which has connected to its forward end a rack bar 38' carrying a rack 39' and meshing with the under side of the gear 33'.

In a similar manner, I provide pull racks 34² for actuating the shafts 23², these pull racks being carried by a frame 35² mounted on rods 36², whose forward ends are connected by a plate 37². To the upper face is secured a rack bar 38² carrying a rack 39² engaging the lower side of the gear 33².

The gears 33, 33' and 33² are mounted to rotate about a common axis, as shown in detail in Figs. 27 and 28, and are connected with knurled wheels by which they can be independently moved. The gear 33 is splined to the main control shaft 40 of a device which is located adjacent to the forward end of the apparatus, to which shaft is connected a knurled wheel 41. To this shaft there is also connected an indicating pointer 42 which overlies a scale 43.

The pinion 33' in connected to a hollow shaft 40', to which is rigidly secured a knurled wheel 41', which bears a pointer 42' (Figs. 1, 2 and 3), which overlies a scale 43'.

The pinion 33² is rigidly connected to a hollow shaft 40² mounted on the shaft 40 and provided with a knurled wheel 41² and a pointer 42², which overlies a scale 43², which is mounted on the stationary hub 44 of one of the bearings carrying the shafts 40, 40' and 40².

From the foregoing it will be noted that the scale 43² is stationary, that the scale 43' is rigidly connected to the pointer 42² and the knurled wheel 41² and that the scale 43 is rigidly connected to the knurled wheel 41' and pointer 42' so as to move therewith for the purposes hereinafter pointed out.

By means of the knurled wheels 41, 41' and 41² and parts connected thereto, the pinions 33, 33' and 33² can be independently operated by hand and the pointers 42, 42' and 42² will indicate upon the scales which they respectively overlie the relative axial positions of the additional sleeves connected thereto by the racks and rods hereinabove referred to.

By using both pull and push racks actuated by the pinions 33, 33' and 33² backlash is reduced to a minimum so that the relative angular positions of the additional sleeves and parts connected thereto can be more accurately adjusted.

The scale 43' is cut away at one portion, as shown, in order to enable the pointer 42 to be connected to the shaft 40.

The mechanism beginning with the sleeves 7, 8 and 9 and ending with the knurled wheels 41, 41', 41² is for the purpose of adjusting certain colored sectors to be hereinafter described. In my apparatus the primary sector is adjusted by the movement of the knurled wheel 41², the secondary sector is adjusted by the knurled wheel 41' and the tertiary sector is adjusted by the knurled wheel 41. As before pointed out, the turning of the knurled wheel 41' results in not only turning its index pointer 42' relatively to the scale which it overlies, but results in turning the scale 43' relatively to the pointer 42, which overlies it, and the turning of the knurled wheel 41' results in not only turning the pointer 42' but the scale 43. For this reason, it would be of advantage to have the turning of the knurled wheel 41' advance the scale 43 from its initial position and the turning of the knurled wheel 41² advance the scale 43' an amount equal to the advance of the previously moved sectors. In order to provide for this, I provide upon the plate 28² a downwardly projecting stud 45 which moves in a groove 46 in the plate 28' and provide the plate 28' with a downwardly projecting stud 47 which moves in a groove 48 in the plate 28, the grooves 46 and 48 having their forward ends so located that when all the plates are in initial position the stud 45 rests against the rearward end of the groove 46 and the stud 47 rests against the rearward end of the groove 48. With this construction a rearward movement of the plate 28² due to the turning of the knurled wheel 41' backward moves all three of the plates 28², 28' and 28 rearwardly by an equal amount, and a subsequent backward movement of the plate 28' by the knurled wheel 41' moves the plate 28 backward by an equal amount, whereupon the plate 28 may be further moved backward by the knurled wheel 41. The backward movement of any push rod thus results in bringing the next succeeding rod into such a position that a further backward movement of its respective knurled hand wheel will at once cause an unfolding movement of its sector, all of which unfoldment is exposed to view. This interconnection is shown in Figs. 24 and 25.

Referring now to the colored sectors hereinbefore referred to, and which embody important features of my invention, each sector is made up of a pack of elements which can be unfolded after the manner of a fan, the pack in folded position being shown in Fig. 7 and in unfolded position in Fig. 9, each element being composed of a ring 49 having three radially projecting vanes 50 whose medial lines are separated from each other by 120°. The front face of each sector is provided with a stud 51 whose center is in line with the rearward edge of one of the three vanes and the rearward face is provided with a recessed slot or cavity 52 (Fig. 10). The pin 51 of the front sector of the front group of pack fits in a hole 53 in a plate 54, which is secured to the shaft 5 by a set screw 55, the plate being provided with studs 56 entering holes in the shaft so as to prevent its turning relatively thereto. The pin 51 of the second sector enters the slot 52 of the first sector and so on through the first pack. The pin 51 of the front member of the second pack moves in the slot 52 of the rear element of the first pack, and so on until the rear sector of the rear pack is reached. The slots 52 in each sector stop the pins 51 therein when the elements of a group are either fully folded or unfolded. The rear element of each pack is formed integral with a hub portion 57 which has a recess 58. The recesses 58 fit upon keys 59, 60 and 61 respectively of members 62, 63 and 64, which connect the respective groups to the sleeves 9, 8 and 7 respectively, these intermediate members being provided with dowel pins 65 which enter holes 66 in the front faces of the respective sleeve members 7, 8 and 9. The rear members of each sector pack are therefore secured to one of the sleeves 7, 8 and 9, with the result that when those sleeves are turned the sector elements are moved. In this way the elements of the primary sector can be moved so as to expose a second primary element either in whole or in part. The elements of the secondary and tertiary sectors can be correspondingly moved in a similar manner so as to be exposed in whole or in part. From this it results that the apparatus with a given set of sectors admits of very fine adjustment through a considerable range. The sector elements illustrated in the drawings are substantially 10% elements, so that when a pack is fully opened the exposure is substantially a 40% exposure where the entire opening or circumference is considered as 100%. Sector packs of different values may be substituted for those shown. Thus, it is desirable to have a large number of different interchangeable sectors, the elements varying from 1% in one pack to 50% in another pack. I preferably have packs of 1% elements, packs of 2% elements, packs of 5% elements, and other packs of 10%, 25% and 50% elements respectively. With the construction shown, a pack of elements of a given per cent. can be used in conjunction with a pack of elements of a different per cent., if desired. In order to get the desired result the center of the forward end of the slot 52 should be on the forward radial line of one of the vanes and the center of the rear end of the slot on the back radial line of that vane, and the centers of the pins 51 should be on the radial line passing through the rear or back edge of the vane. Where elements of different percentages are used, the elements corresponding to the larger per cent. should preferably be in the front pack, except where a complete white background is desired, in which case the white sector should be in the rear. In every case the slot 52 should be of such a length as to permit a rearward element to move sufficiently to be out from under cover by the preceding element of its pack.

By substituting sector packs having elements of different dimensions, variations down to one-tenth of one per cent. can be easily obtainable, which variations are within the limits of accuracy of observation of color change.

In order to adapt the instrument for the use of the sector elements of different dimensions, the scales 43, 43' and 43² are formed, as shown in Fig. 31, in which, as indicated, the upper scale is for indicating the positions of one per cent. sectors and the subsequent markings are used for indicating the relative positions of sectors of 2%, 5%, 10%, 25% and 50%.

Each sector element, as above stated, is provided with three radial vanes with the result that a movement of any one of the pointers 42, 42', 42², indicating a given per cent. in the amount of color exposed, need only be one-third of the amount which would be necessary if the sectors were provided with but one vane each. This makes it possible to reduce the length of the scales 43, 43', 43².

In operation the shaft 5 is preferably rotated in the same direction as that in which the sector elements are moved relatively to one another in their folding movements so as to have the manual control opposite the tendency of the sectors to close up on account of the rotary movement imparted by the shaft 5.

The apparatus as thus far described can be used in various known ways for the matching of color. In connection therewith I have devised a means to assist in observing the effects produced, which I prefer to use as follows: I surround the sectors by a dark box 67, preferably lined with black velvet. The rear wall of this box closely surrounds the outer sleeve 7 at the rear of the sectors so as to exclude light and is provided with means for holding a sample 68 of a color to be matched or analyzed adjacent to the revolving vanes of the sectors. This box is provided with two openings 69 and 70 through which pass rays of light. The light through one opening impinges upon a portion of the field or space traveled by the rotating vanes. The other opening is provided with an adjustable cat's-eye shutter 71, which may be opened or closed to any extent so as to vary the amount of light admitted therethrough, which light impinges on the sample. At the front end of the box I locate two angularly disposed mirrors 72 and 73, in which images of the spots produced by the rays of light on the sectors and sample are formed, and to the rear of these mirrors I locate another mirror 74, which receives the reflections from the mirrors 72 and 73 and in turn reflects them toward the object-glass 75 of a divided field telescope 76, such as is a common instrument in optical measurements, and thence to the eye of the observer, as shown in dots. This divided field telescope with its lens 77 brings the two images closely adjacent to one another in such a manner that when a color match is not present a sharp line of demarcation appears, but when a match has been produced this line disappears, thus affording ideal conditions for observation and determination. In order to stop off the size of the patches of color on both sectors and sample so that the portions observed through the telescope shall be equal in area, I provide iris diaphragms 78 between them and the mirrors 72 and 73.

In using the apparatus above described for the purpose of matching, I introduce the sample 68, supporting it in a convenient holder at the proper place, the sample being as near as possible in the plane formed by the spinning sectors. Certain sectors whose area and color are known to approximate the hue of the sample to be matched are placed upon the episcotister and locked to it by means of the front plate 54 and binding screws 55 in the manner described, and the motor set in operation, causing the sectors to rotate rapidly. The sectors and sample are then observed through the eye-piece of the telescope and adjustments are made of the knurled hand wheels 41, 41', 41² until the two fields of the divided field telescope become of a single or uniform color. When this takes place the medial line of this divided field disappears and the two colors appear as one complete circle of color, at which point a match is said to have been reached. The indications upon the scales 43, 43', 43² are then observed and recorded, together with the identification marks upon the sectors, affording a guide for the reproduction of that color whenever desired. To aid in darkening the effect of color produced by the spinning sectors, opening and closing adjustment is made of the cat's-eye by the adjusting means 79 until a balance of this color with that of the sample to be matched is reached.

Further, as will be obvious, the apparatus may be used for the creating of new shades, in which case no sample is used but the sectors and cat's-eye are adjusted until a desired color is obtained and the readings thereupon taken, whereby data are obtained from which that color can be reproduced, as desired.

In using this apparatus with the box described the rear sector is a white sector of such dimensions that when opened up it shows 100% white, except for the space covered by the primary sector, as shown at 50³ in Fig. 34, and in proceeding to make a match the rear sector is opened up to that extent in the first instance, whereupon the primary or primary and secondary sectors are opened up over the white sector to whatever extent may be necessary with the adjustment of the cat's-eye shutter to obtain a match of the sample which is being studied. By using the 100% white sector and primary and secondary sectors of the proper color, a match can be made with any other color. The colors for these primary and secondary sectors are determined in accordance with principles of practice well understood by those skilled in the art. Instead of using a folding white sector, a sector in the form of a complete white disk may be used at the rear of the pack.

In using the apparatus under other conditions, the rear sector is a black sector of such dimensions that when opened up it shows 100% black, except for the space covered by the primary sector and in proceeding it is opened up to that extent in the first instance, or instead of using a black sector the instrument with the sectors as herein shown and described may be inclosed in a box lined with black velvet, having a small aperture through which the sectors are visible. By this means the same effect is produced as with the 100% black sector, except that the black afforded by the box is more nearly an absolute black.

As will be evident to those skilled in the art, my invention permits of various modifications without departing from the spirit thereof or the scope of the appended claims.

What I claim is:

1. In an apparatus of the class described, the combination of primary, secondary and tertiary sectors fixed against axial movement relatively to one another, means for rotating said sectors simultaneously about a common axis, and means for angularly adjusting at least two of said sectors relatively to each other and to the third sector while they are being rotated, said means for adjusting each adjustable sector being independent of the means for adjusting any other sector.

2. In an apparatus of the class described, the combination of primary, secondary and tertiary sectors fixed against axial movement, means for rotating said sectors simultaneously about a common axis, and means for adjusting at least two of said sectors relatively to each other and to the third sector while they are being rotated, two of said sectors being each composed of a plurality of relatively movable folding elements, the extent of the unfolding of which is determined by said adjusting means, said means for adjusting each adjustable sector being independent of the means for adjusting any other sector.

3. In an apparatus of the class described, the combination of primary, secondary and tertiary sectors fixed against axial movement, means for rotating said sectors simultaneously about a common axis, means mounted on a stationary base for adjusting at least two of said sectors relatively to each other and to the third sector while they are being rotated, said means for adjusting each adjustable sector being independent of the means for adjusting any other sector, and means carried thereby for indicating the adjustment of said two sectors relatively to each other and to said third sector.

4. In an apparatus of the class described, the combination of primary, secondary and tertiary sectors fixed against axial movement, means for rotating said sectors simultaneously about a common axis, and manually operative means for adjusting two of said sectors relatively to each other and to the third sector while they are being rotated, said manually operating means extending to the front of the instrument and being operable by the user while observing the effects produced by the sectors.

5. In an apparatus of the character described, the combination of a plurality of relatively movable sectors, sleeves fixed against longitudinal movement and upon which said sectors are carried, additional sleeves coöperating with said first named sleeves and splined thereto respectively, said additional sleeves having corresponding cam slots, a rotatable shaft carrying all of said sleeves, a member carried by said shaft and engaging said cam slots, means for rotating said shaft, and means for moving said additional sleeves relatively to the sector-carrying sleeves to which they are splined and to one another.

6. In an apparatus of the character described, the combination of a plurality of relatively movable sectors, sleeves fixed against longitudinal movement upon which said sectors are carried, additional sleeves coöperating with said first named sleeves and splined thereto respectively, said additional sleeves having corresponding cam slots, a rotatable shaft carrying all of said sleeves, a member carried by said shaft and engaging said cam slots, means for rotating said shaft, means for moving said additional sleeves relatively to the sleeves to which they are splined and to one another, and an indicator for indicating the movements of said additional sleeves and the sectors controlled thereby.

7. In an apparatus of the class described, the combination of primary, secondary and tertiary sectors, means for rotating said sectors simultaneously about a common axis, means carried by a stationary base for adjusting two of said sectors relatively to each other and to the third sector while they are being rotated, means carried thereby for indicating the adjustment of said two sectors, said means being provided with a plurality of scales, each scale having a plurality of markings adapted to be used with sectors of different dimensions.

8. In an apparatus of the class described, the combination of primary, secondary and tertiary sectors, means for rotating said sectors simultaneously about a common axis, means for adjusting two of said sectors relatively to each other and to the third sector while they are being rotated, and normally stationary means for indicating the adjustment of said two sectors, said indicating means having pointers and scales, the scales being graduated so that the relative movement between the scales and their markers indicate the movements of the sectors, the sectors having a plurality of arms and the scales having corresponding markings.

9. In an apparatus of the class described, the combination of primary, secondary and tertiary sectors, means for rotating said sectors simultaneously about a common axis, means for adjusting two of said sectors relatively to each other and to the third sector while they are being rotated, and normally stationary means for indicating the adjustment of said two sectors, said indicating means having pointers and scales, the scales being graduated so that the relative movement between the scales and their markers indicates movements of the sectors, one of said scales being stationary, and each succeeding scale being mechanically connected with the sector of the preceding scale.

10. In an apparatus of the class described, the combination of primary, secondary and tertiary sectors, means for rotating said sectors simultaneously about a common axis, means for adjusting two of said sectors relatively to each other and to the third sector while they are being rotated, and normally stationary means for indicating the adjustment of said two sectors, said indicating means having pointers and scales, the scales being graduated so that the relative movement between the scales and their markers indicates the movements of the sectors, one of said scales being stationary, and each succeeding scale being movable with the sector of the preceding scale, the means for adjusting the intermediate sector being connected to the means for moving the preceding sector so as to be advanced thereby up to the limit of the motion of said preceding sector.

11. In an apparatus of the character described, supporting bearings, a rotatable shaft mounted therein, means for continuously rotating said shaft at a rapid rate, a sector made up of a plurality of folding elements lying in parallel planes and each movable in its plane relatively to the others, said sector being carried by said rotatable shaft, means for limiting the movements of said elements relatively to one another and means for folding and unfolding said elements while said shaft is being rotated.

12. In an apparatus of the character described, supporting bearings, a rotatable shaft mounted therein, means for continuously rotating said shaft at a rapid rate, a sector made up of a plurality of folding elements lying in parallel planes and each movable in its plane relatively to the others, said sector being carried by said rotatable shaft, means for limiting the movements of said elements relatively to one another, said means consisting of slots in said elements and pins upon successive elements entering said slots and movable therein, and means for folding and unfolding said elements while said shaft is being rotated.

13. In an apparatus of the character described, a plurality of sectors, each made up of a plurality of folding elements, and means for limiting the movements of said elements relatively to one another, the first of said elements being fixed relatively to the driving shaft and provided with a slot, and the succeeding elements being provided with corresponding slots and pins, the pins being movable in said slots.

14. In an apparatus of the class described, the combination of primary, secondary and tertiary sectors, means for rotating said sectors simultaneously about a common axis, means for adjusting two of said sectors angularly relatively to each other and to the third sector while they are being rotated, a box having a dark interior surrounding said sectors, means for supporting a sample therein, said box having openings for illuminating said sample, and a field through which said sectors pass, mirrors and a divided field telescope bringing the images of said sample and said field into juxtaposition for observation and comparison.

15. In an apparatus of the class described, the combination of primary, secondary and tertiary sectors, means for rotating said sectors simultaneously about a common axis, means for manually adjusting two of said sectors angularly relatively to each other and to the third sector while they are being rotated, a box having a dark interior surrounding said sectors, means for supporting a sample therein, said box having openings for illuminating said sample and a field through which said sectors pass, mirrors and a divided field telescope bringing the images of said sample and said field into juxtaposition for observation and comparison, and means for varying the amount of light illuminating said field.

16. In an apparatus of the class described, the combination of primary, secondary and tertiary sectors, means for rotating said sectors simultaneously about a common axis, means for manually adjusting two of said sectors angularly relatively to each other and to the third sector while they are being rotated, a box having a dark interior surrounding said sectors, means for supporting a sample therein, said box having openings for illuminating said sample and a field through which said sectors pass, mirrors and a divided field telescope bringing the images of said sample and said field into juxtaposition for observation and comparison, and means for varying the amount of light illuminating said field, said adjusting means being located adjacent to said box and accessible for manual operation by the observer while looking through the telescope.

17. In an apparatus of the character described, the combination of a plurality of sectors movable relatively to one another about an axis, a driving shaft in line with said axis, means parallel to said axis for adjusting the relative positions of said sectors and extending from the rear of said sectors toward the front thereof, and means located adjacent to the front of said sectors for actuating said adjusting means.

18. In an apparatus of the character described, a plurality of relatively movable sectors, a plurality of sleeves connected to said sectors respectively, a plurality of additional sleeves splined to said first mentioned sleeves respectively and provided with circular racks, a plurality of pinions engaging said racks respectively, the vertical shafts carrying said pinions, and a plurality of longitudinally extending racks geared to said shafts, rods carrying said longitudinally extending racks extending to the front of said sectors, and means located adjacent to the front of said sectors for moving said rods.

19. In an apparatus of the character described, a plurality of relatively movable sectors, a plurality of sleeves connected to said sectors respectively, a plurality of additional sleeves splined to said first mentioned sleeves respectively and provided with circular racks, a plurality of pinions engaging said racks respectively, vertical shafts carrying said pinions, and a plurality of longitudinally extending racks geared to said shafts, rods carrying said longitudinally extending racks extending to the front of said sectors, means located adjacent to the front of said sectors for moving said rods, and additional racks and rods geared to said shafts and actuated by said means, the members of each pair of racks geared to the same shaft being geared to that shaft at opposite sides.

20. In an apparatus of the character described, a plurality of relatively movable sectors, a plurality of sleeves connected to said sectors respectively, a plurality of additional sleeves splined to said first mentioned sleeves respectively and provided with circular racks, a plurality of pinions engaging said racks respectively, vertical shafts carrying said pinions, and a plurality of longitudinally extending racks geared to said shafts, rods carrying said longitudinally extending racks extending to the front of said sectors, and means located adjacent to the front of said sectors for moving said rods, said rods having connections whereby a movement of one rod advances the position of another rod from its initial position and permits said other rods to be further advanced without moving the first mentioned rod.

HIBBARD S. BUSBY.